Dec. 21, 1948.   N. T. KNUTSON ET AL   2,456,711
ADJUSTABLE CONDENSER LENS FOR PROJECTION SYSTEMS
Filed March 14, 1947   2 Sheets-Sheet 1
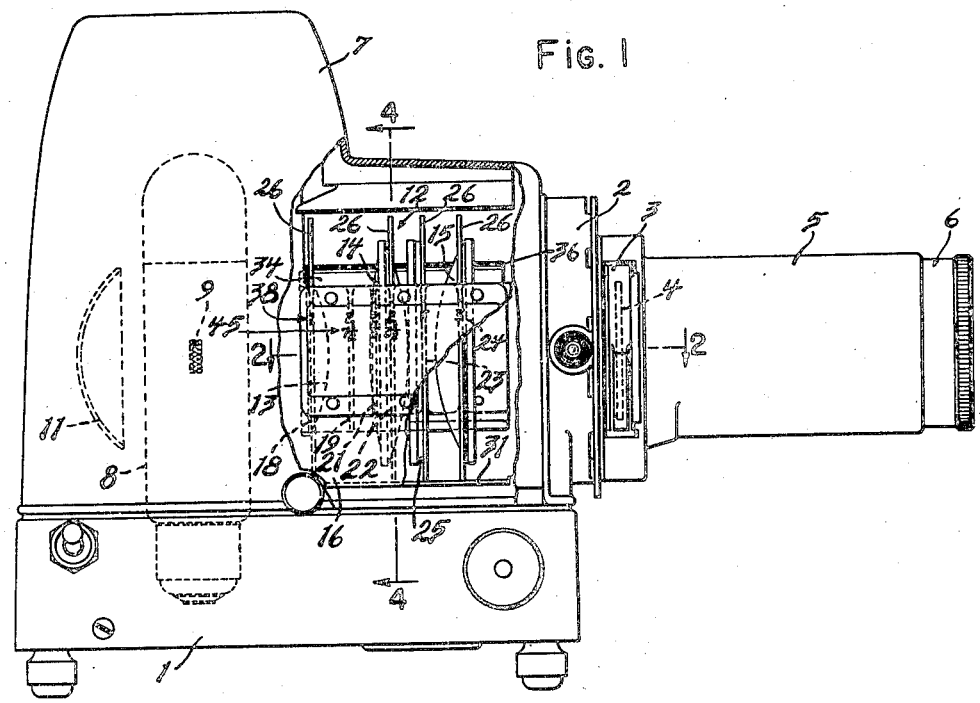
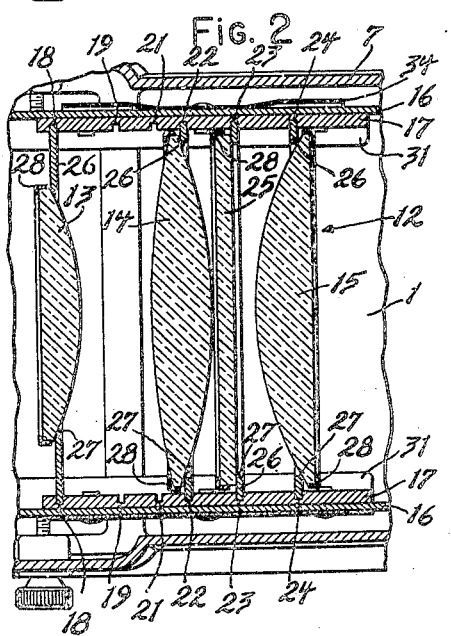
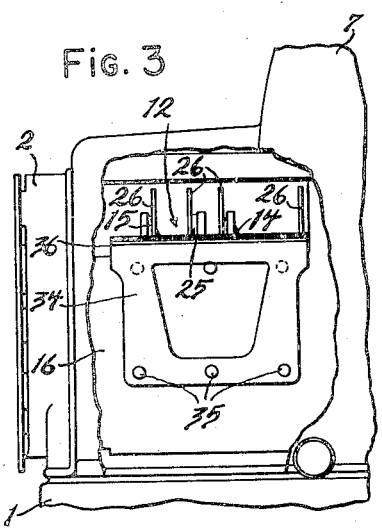
INVENTORS
NORMAN T. KNUTSON
BY   PAUL C. FOOTE
ATTY.

Dec. 21, 1948. N. T. KNUTSON ET AL 2,456,711
ADJUSTABLE CONDENSER LENS FOR PROJECTION SYSTEMS
Filed March 14, 1947 2 Sheets-Sheet 2

INVENTORS
NORMAN T. KNUTSON
BY  PAUL C. FOOTE
ATTY.

Patented Dec. 21, 1948

2,456,711

UNITED STATES PATENT OFFICE 2,456,711

ADJUSTABLE CONDENSER LENS FOR PROJECTION SYSTEMS

Norman T. Knutson, Chicago, and Paul C. Foote, Lake Bluff, Ill., assignors to Bell & Howell Company, Chicago, Ill., a corporation of Illinois Application March 14, 1947, Serial No. 734,750

3 Claims. (Cl. 88—24)

Our invention relates particularly to a projection system for picture projectors involving interchangeable projection lenses of different focal lengths for the purpose of providing different magnifications of the projected pictures.

To obtain maximum efficiency from a projection system it is necessary that the light cone from the condenser lens match the acceptance cone of the projection lens, and the angles of the acceptance cones of projection lenses of different focal lengths being different it follows that a condenser lens of fixed equivalent focal length can only function efficiently with a projection lens of a certain focal length.

Objects of our invention reside in the provision of a novel and efficient adjustable condenser lens for a projection system involving interchangeable projection lenses of preselected different focal lengths, which is quickly and convenienty predeterminately adjustable to vary the equivalent focal length thereof and thus match the light cone therefrom with the acceptance cone of any one of interchangeable projection lenses of preselected different focal lengths, which does not involve the undesirable substitution of condenser lens components, which involves mountings for the condenser lens components affording quick and convenient adjustment of the condenser lens and removal and replacement of the condenser lens components and which preferably prevent reverse mounting of the condenser lens components, which provides designations indicating the proper placement of the condenser lens components, and which provides other designations indicating the proper relative adjustment of the condenser lens components for the different focal lengths of the projection lenses.

The invention will be better understood by reference to the accompanying drawing forming a part hereof and in which—

Figure 1 is a side elevation of a slide projector embodying our invention and having a portion of the casing thereof broken away;

Figure 2 is a partial sectional view substantially on the line 2—2 of Figure 1;

Figure 3 is a partial side elevation of the projector taken oppositely with respect to Figure 1;

Figure 4:
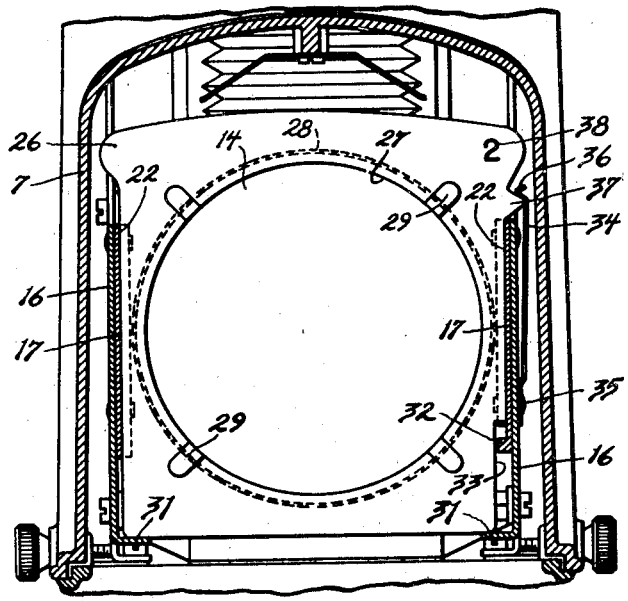
Figure 4 is a partial sectional view substantially on the line 4—4 of Figure 1.

Referring to the drawing and particularly to Figure 1, the base of the slide projector is designated at 1, and an upright transversely extending support 2 is fixedly secured on the front end of the base and carries a transversely reciprocable slide carrier 3 for sequentially positioning picture bearing slides or transparencies 4 across the axis of the projection system for the projection of pictures therefrom. A tubular projection lens mount 5 is also carried by the support 2 in coaxial relation with the projection system, and a projection lens 6 is slidably engageable within the lens mount for longitudinal adjustment to focus the same for different projection screen distances and for interchange with other projection lenses of different focal lengths for providing different magnifications of the projected pictures.

A casing 7 extends rearwardly from the support 2 and encloses the light source and condenser lens of the projection system and is removably mounted on the base 1 to provide access to the light source and condenser lens. The light source comprises a usual concentrated filament incandescent lamp 8 mounted rearwardly on the base 1 with its filament 9 arranged across the axis of the projection system and supplemented as usual by a forwardly facing concave reflector 11 disposed at the rear of the lamp.

The condenser lens of our invention, generally designated at 12, being disposed between the lamp and the plane of a slide or transparency 4 in the carrier 3 and assuming it to be properly adjusted for the projection lens being used as hereinafter described, functions in the usual manner with the light cone from the condenser lens approximately matching the acceptance cone of the projection lens so that the lamp filament is imaged within the projection lens in a size corresponding with the aperture of the projection lens and maximum illumination is obtained.

The condenser lens 12 shown is of the three element expanded light source to slide plane design, and comprises a light source adjacent end component 13, a middle component 14, and a slide plane adjacent end component 15, of which the middle component is axially shiftable relative to the end components to vary the equivalent focal length of the condenser lens and of which the end components are fixed relative to the light source or lamp 8 of the projection system.

Two parallel vertical support plates 16 are mounted on the base 1 and extending upwardly therefrom, are disposed on opposite sides of and in parallelism with the axis of and in the region of the condenser lens. See Figures 1 and 4. Two mounting plates 17 are respectively secured on the inner or opposing faces of the plates 16 so that they are disposed on opposite sides of and in parallelism with the condenser lens axis, and are provided with a plurality of slide mounts 18, 19, 21, 22, 23 and 24 each of which mounts comprises a pair of vertically disposed opposing parallel slide slots respectively formed on the mounting plates 17 and spaced transversely of and disposed on opposite sides of the condenser lens axis.

The condenser lens components 13, 14 and 15 and a usual heat filter 25 are respectively mounted on rectangular carrier plates 26 in coaxial relation with central apertures 27 through the carrier plates by means of flanged rings 28 secured on the carrier plates by bent lugs 29 as shown in Figure 4.

Opposite side edge portions of the carrier plates 26 are slidably engageable in the pairs of slide slots for the removable mounting of the carrier plates and their lenses or heat filter on the slide mounts, and the lower edges of the carrier plates engage downwardly on downwardly disposed horizontal flanges 31 of the support plates 16 to vertically position the carrier plates. See Figure 4. One of the mounting plates 17 is provided with a downwardly disposed horizontal flange 32 positioned above the flanges 31 and the lower portion of one side edge of each carrier plate is stepped inwardly, as designated at 33, to clear the flange 32 when the carrier plate is engaged in a slide mount in the proper facewise relation. However, when a carrier plate is engaged in a slide mount in the facewise relation opposite the proper one, the opposite straight side edge portion of the carrier plate engages against the flange 32 longitudinally of the slide mount and prevents further downward movement of the carrier plate into its mounting position, so that reverse mounting of the carrier plates is prevented.

A single latch spring 34, see Figures 3 and 4, has its lower portion secured as designated at 35 on the outer surface of one of the support plates 16 and is provided at its upper portion with a cam latch portion 36 extending longitudinally of the condenser lens and under which cam latch projections 37 on the carrier plates 26 are engageable by reason of the bias of the spring to retain all of the carrier plates on the slide mounts, the carrier plates being releasable by manually flexing the spring against its bias.

The end condenser lens components 13 and 15 are mountable respectively in the slide mounts 18 and 24 to fixedly position the same relative to the lamp 8, and the heat filter 25 is mountable in the slide mount 23. The middle condenser lens component is selectively mountable in the slide mounts 19, 21 or 22 to predeterminately vary the equivalent focal length of the condenser lens.

Differentiating designations 38 are respectively associated with corresponding of the slide mounts 18, 19, 21, 22, 23 and 24 and the carrier plates 26 to indicate the proper relative mounting of the condenser lens components and the heat filter. These designations of the slide mounts are placed on the outer surface of one of the support plates 16, see Figure 1, and consist of the number 1 associated with the slide mount 18, the number 2 associated with the slide mounts 19, 21 and 22, the letter F associated with the slide mount 23 and the number 3 associated with the slide mount 24, and corresponding of these designations are placed on the carrier plates and consist of the number 1 on the carrier plate of the end condenser lens component 13, the number 2 on the carrier plate of the middle condenser lens component 14 as shown in Figure 4, the letter F on the carrier plate of the heat filter 25, and the number 3 on the end condenser lens component 15.

The slide mounts 19, 21 and 22 provide for predeterminately selectively axially positioning the middle condenser lens component 14 relative to the end condenser lens components 13 and 15 in a plurality of predetermined positions to approximately match the light cone from the condenser lens with the acceptance cone of any of a plurality of interchangeable projection lenses of preselected different local lengths.

Figure 5:
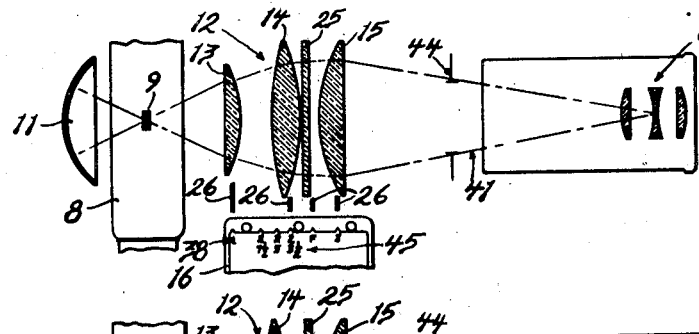
Figures 5, 6 and 7 are diagrammatic partially sectional views of the projection system of the projector showing it employing projection lenses of different focal lengths and showing the condensing lens of the system correspondingly adjusted.
Figure 6:
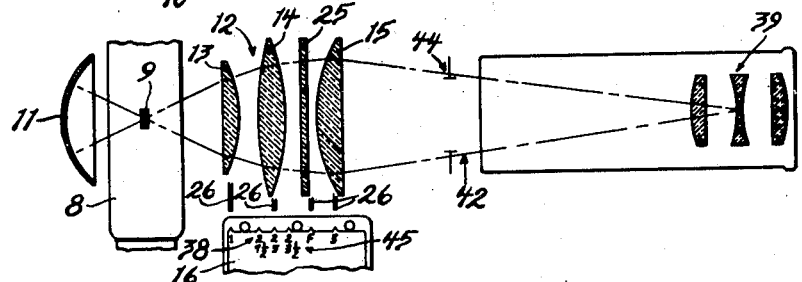
Figure 7:
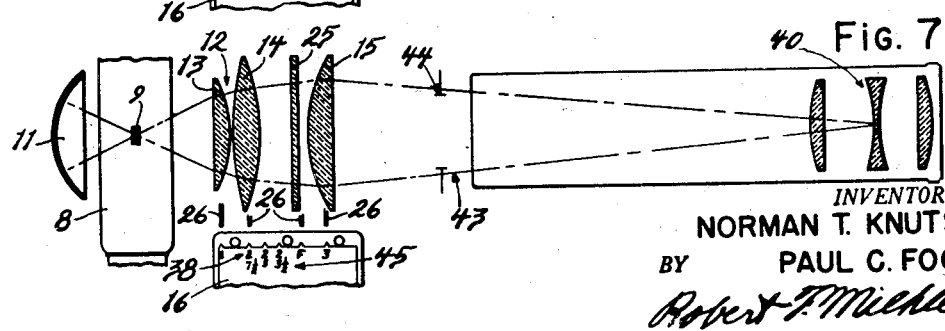

By way of examples, let it be assumed that the projection lens 6 of Figures 1 and 5 has a focal length of 3½ inches, that the projection lens 39 of Figure 6 has a focal length of 5 inches, and that the projection lens 40 of Figure 7 has a focal length of 7½ inches. When the projection lens 6 is used, the middle condenser lens component 14 is mounted on the slide mount 22 and the condenser lens has a short equivalent focal length and the light cone from the condenser lens matches the acceptance cone of the projection lens 6 as indicated at 41 in Figure 5. When the projection lens 39 is used, the middle condenser lens component 14 is mounted on the slide mount 21 and the condenser lens has a longer equivalent focal length and the light cone from the condenser lens matches the acceptance cone of the projection lens 39 as indicated at 42 in Figure 6. When the projection lens 40 is used, the middle condenser lens component 14 is mounted on the slide mount 19 and the condenser lens has a still longer equivalent focal length and the light cone from the condenser lens matches the acceptance cone of the projection lens 40 as indicated at 43 in Figure 7. The aperture of the slide or transparency 4 from which a picture is being projected is indicated at 44 in Figures 5, 6 and 7, this aperture being of course covered by the light cone of the condenser lens in the several adjustments of the lens.

Differentiating designations 45 are respectively associated with the slide mounts 19, 21 and 22 on which the middle condenser lens component 14 is selectively mountable and respectively identify these slide mounts with the interchangeable projection lenses 6, 39 and 40, these designations being placed on the support plate 16 on which the designations 38 of the slide mounts are placed and comprising the number 3½ for the slide mount 22, 5 for the slide mount 21 and 7½ for the slide mount 19, these designations facilitating adjustment of the condenser lens for a selected projection lens.

While we have thus described our invention, we do not wish to be limited to the precise details described, as changes may be readily made without departing from the spirit of our invention, but having thus described our invention, we claim as new and desire to secure by Letters Patent the following:

1. In an adjustable condenser lens for a projection system involving interchangeable projection lenses of preselected different focal lengths, the combination of a condenser lens comprising three components of which the middle component is shiftable relative to the end components to vary the equivalent focal length of the condenser and of which the end components are fixed relative to a light source of the projection system, and positioning means for positioning said end components and selectively positioning said middle component in a plurality of predetermined positions to approximately match the light cone from the condenser lens with the acceptance cone of any of said interchangeable projection lenses and comprising three carrier plates upon which said components are respectively mounted and a plurality of mounts greater in number than that of said components and predeterminately spaced longitudinally of the condenser lens axis and on the end mounts of which the carrier plates of said end components are respectively mountable and on the intermediate mounts of which the carrier plate of said middle component is selectively mountable, each of said mounts comprising a pair of parallel slide elements spaced transversely of and disposed on opposite sides of the condenser lens axis and with which opposite edge portions of a carrier plate is slidably engageable, and a single latch means operative to releasably retain said components on said mounts.

2. In an adjustable condenser lens for a projection system involving interchangeable projection lenses of preselected different focal lengths, the combination of a condenser lens comprising a plurality of components relatively axially shiftable to vary the equivalent focal length of the condenser lens, positioning means for selectively relatively positioning said components in a plurality of predetermined relative positions to approximately match the light cone from the condenser lens with the acceptance cone of any of said interchangeable projection lenses and comprising a plurality of mounts greater in number than that of said components and predeterminately spaced longitudinally of the condenser lens axis and on a number less than all of which one of said components is selectively mountable and on the remainder of which the remainder of said components is mountable, differentiating designations respectively associated with corresponding of said mounts and components to indicate the proper mounting of said components, and additional differentiating designations respectively associated with said mounts on which said one component is selectively mountable and respectively identifying the latter mounts with said interchangeable projection lenses.

3. In an adjustable condenser lens for a projection system involving interchangeable projection lenses of preselected different focal lengths, the combination of a condenser lens comprising three components of which the middle component is shiftable relative to the end components to vary the equivalent focal length of the condenser and of which the end components are fixed relative to a light source of the projection system, positioning means for positioning said end components and selectively positioning said middle component in a plurality of predetermined positions to approximately match the light cone from the condenser lens with the acceptance cone of any of said interchangeable projection lenses and comprising three carrier plates upon which said components are respectively mounted and a plurality of mounts greater in number than that of said components and predeterminately spaced longitudinally of the condenser lens axis and on the end mounts of which the carrier plates of said end components are respectively mountable and on the intermediate mounts of which the carrier plate of said middle component is selectively mountable, each of said mounts comprising a pair of parallel slide elements spaced transversely of and disposed on opposite sides of the condenser lens axis and with which opposite edge portions of a carrier plate is slidably engageable, differentiating designations respectively associated with corresponding of said mounts and carrier plates to indicate the proper relative mounting of said components, and additional differentiating designations respectively associated with said mounts on which the carrier plate of said middle component is selectively mountable and respectively identifying the latter mounts with said interchangeable projection lenses.

NORMAN T. KNUTSON.
PAUL C. FOOTE.

REFERENCES CITED

The following references are of record in the file of this patent:

UNITED STATES PATENTS

| Number | Name | Date |
| --- | --- | --- |
| 297,851 | Roche | Apr. 29, 1884 |
| 780,590 | Anderson | Jan. 24, 1905 |
| 1,118,187 | Depue | Nov. 24, 1914 |
| 1,338,818 | Dennington | May 4, 1920 |
| 1,527,883 | Lare et al. | Feb. 24, 1925 |
| 1,540,340 | Kesses | June 2, 1925 |
| 1,932,701 | Kurze | Oct. 31, 1933 |
| 2,169,010 | Teague et al. | Aug. 8, 1939 |
| 2,231,743 | Young et al. | Feb. 11, 1941 |
| 2,292,966 | Osterberg | Aug. 11, 1942 |
| 2,425,863 | Carlson | Aug. 19, 1947 |